(12) United States Patent
Sendrea

(10) Patent No.: US 6,659,241 B2
(45) Date of Patent: Dec. 9, 2003

(54) SHOCK ABSORBER COMPRESSION DAMPING ADJUSTMENT

(75) Inventor: Darryl Sendrea, Brampton (CA)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/935,190

(22) Filed: Aug. 22, 2001

(65) Prior Publication Data

US 2003/0038411 A1 Feb. 27, 2003

(51) Int. Cl.$^7$ .................................................. B60G 17/08
(52) U.S. Cl. ........................................ 188/314; 188/318
(58) Field of Search ................................. 188/314, 315, 188/318, 316, 317; 251/263, 251, 340

(56) References Cited

U.S. PATENT DOCUMENTS

| | | | |
|---|---|---|---|
| 2,715,512 A | * 8/1955 | Miller et al. | 188/314 |
| 4,153,237 A | * 5/1979 | Supalla | 188/314 |
| 4,732,244 A | * 3/1988 | Verkuylen | 188/318 |
| 5,533,586 A | 7/1996 | Thompson | |
| 5,664,649 A | 9/1997 | Thompson et al. | |
| 5,692,579 A | 12/1997 | Peppel et al. | |
| 6,112,840 A | 9/2000 | Forbes | |
| 6,260,832 B1 | 7/2001 | Vignocchi et al. | |
| 6,263,994 B1 | 7/2001 | Eitel | |

* cited by examiner

*Primary Examiner*—Matthew C. Graham
(74) *Attorney, Agent, or Firm*—Carlson, Caskey & Olds

(57) ABSTRACT

An adjustable shock absorber is provided that includes a body having a fluid passageway with first and second passages in fluid communication with one another. A valve assembly is arranged between the passages and includes a plunger that is adjustable between a plurality of positions corresponding to a plurality of fluid flow positions. The valve assembly includes a metering valve having a orifice in a disc, and the plunger includes a needle with a portion disposed in said orifice to provide flow area. The flow area is changed when the plunger moves. The valve assembly also includes a blow-off valve in which the disc is biased to a closed position by a spring arranged between the plunger and the disc. Movement of the plunger changes the loading on the spring. An adjustment knob has a cammed surface that cooperates with the plunger so that as the adjustment knob is rotated the cammed surface moves the plunger. In this manner, the blow-off and metering valves may be adjusted simultaneously, or independently if the metering and blow-off valves are separated, to provide more desirable shock absorber adjustment. Moreover, adjustment of the shock absorber is not necessarily limited to a finite number of distinct positions.

5 Claims, 2 Drawing Sheets

SHOCK ABSORBER COMPRESSION DAMPING ADJUSTMENT

BACKGROUND OF THE INVENTION

This invention relates to an adjustable shock absorber, and more particularly, the invention relates to a shock absorber with a compression damping adjustment.

Shock absorbers are used in vehicles to dampen inputs from roadways. For some vehicle applications, such as snowmobiles, it may be highly desirable to provide the ability to easily adjust the damping characteristics of a shock absorber. For example, snowmobile ride characteristics may be affected due to the variation of weight from different and multiple passengers. The greater the vehicle's and passenger's static weight, the more the shock absorber will become compressed thereby lessening its damping capability. To this end, adjustable shock absorbers have been developed to permit the driver to adjust the damping characteristics of the shock absorber to accommodate varying weights and personal vehicle handling preferences.

Shock absorber damping may be changed by providing various valves and orifices through which fluid flows within the shock absorber. Inhibiting fluid flow will make the shock absorber stiffer, and increasing fluid flow will make the shock absorber softer. In the prior art, a driver could adjust the damping of the shock absorber by selecting from several distinct settings. A screw has been attached to a drum having orifice of different sizes arranged radially about the drum. As the screw was turned, a particular orifice was arranged in a fluid passageway to control the flow of fluid through the passageway. A detent mechanism was associated with the screw and drum such that the orifice was maintained in alignment with the passageway.

Alternatively, the stiffness of a spring biasing a blow-off valve has been varied to adjust shock absorber damping. A screw was used to load and unload the blow-off valve spring to control the flow of fluid through the valve. However, a single adjustment mechanism has not been provided to permit adjustment of both a blow-off valve and an orifice. Moreover, an adjustment member has not been provides that permits damping adjustment through an infinite number of positions. Therefore, what is needed is an adjustable shock absorber that provides a drive with increased adjustment of the flow through the shock absorber.

SUMMARY OF THE INVENTION AND ADVANTAGES

The present invention provides an adjustable shock absorber including a body having a fluid passageway with first and second passages in fluid communication with one another. A valve assembly is arranged between the passages and includes a plunger that is adjustable between a plurality of positions corresponding to a plurality of fluid flow positions. The valve assembly includes a metering valve having a orifice in a disc, and the plunger includes a needle with a portion disposed in said orifice to provide flow area. The flow area is changed when the plunger moves. The valve assembly also includes a blow-off valve in which the disc is biased to a closed position by a spring arranged between the plunger and the disc. Movement of the plunger changes the loading on the spring. An adjustment knob has a cammed surface that cooperates with the plunger so that as the adjustment knob is rotated the cammed surface moves the plunger. In this manner, the blow-off and metering valves may be adjusted simultaneously, or independently if the metering and blow-off valves are separated, to provide more desirable shock absorber adjustment. Moreover, adjustment of the shock absorber is not necessarily limited to a finite number of distinct positions.

Accordingly, the above invention provides an adjustable shock absorber that provides a drive with increased adjustment of the flow through the shock absorber.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
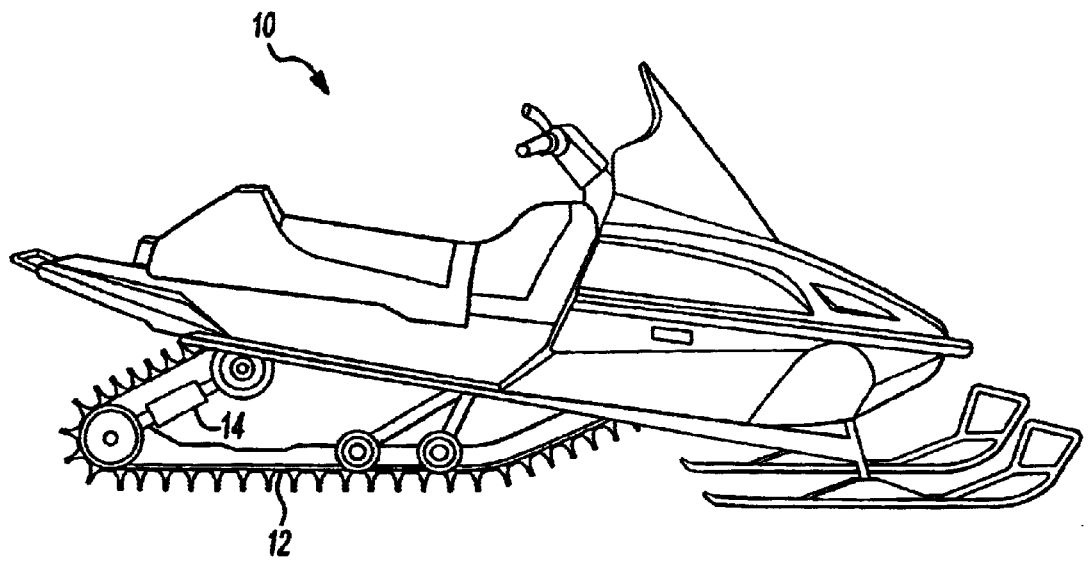
FIG. 1 is a schematic view of a snowmobile depicting a rear shock absorber in phantom.

A snowmobile 10 is schematically depicted in FIG. 1. The snowmobile 10 includes tracks 12 that are connected to the body of the snowmobile by suspension linkages and a rear shock absorber 14 for damping inputs from the roadway. The present invention adjustable shock absorber is desirable for snowmobile application, and most desirable for rear shock absorbers for snowmobiles. However, it is to be understood that the adjustable shock absorber may be utilized for any number of other applications.

Figure 2:
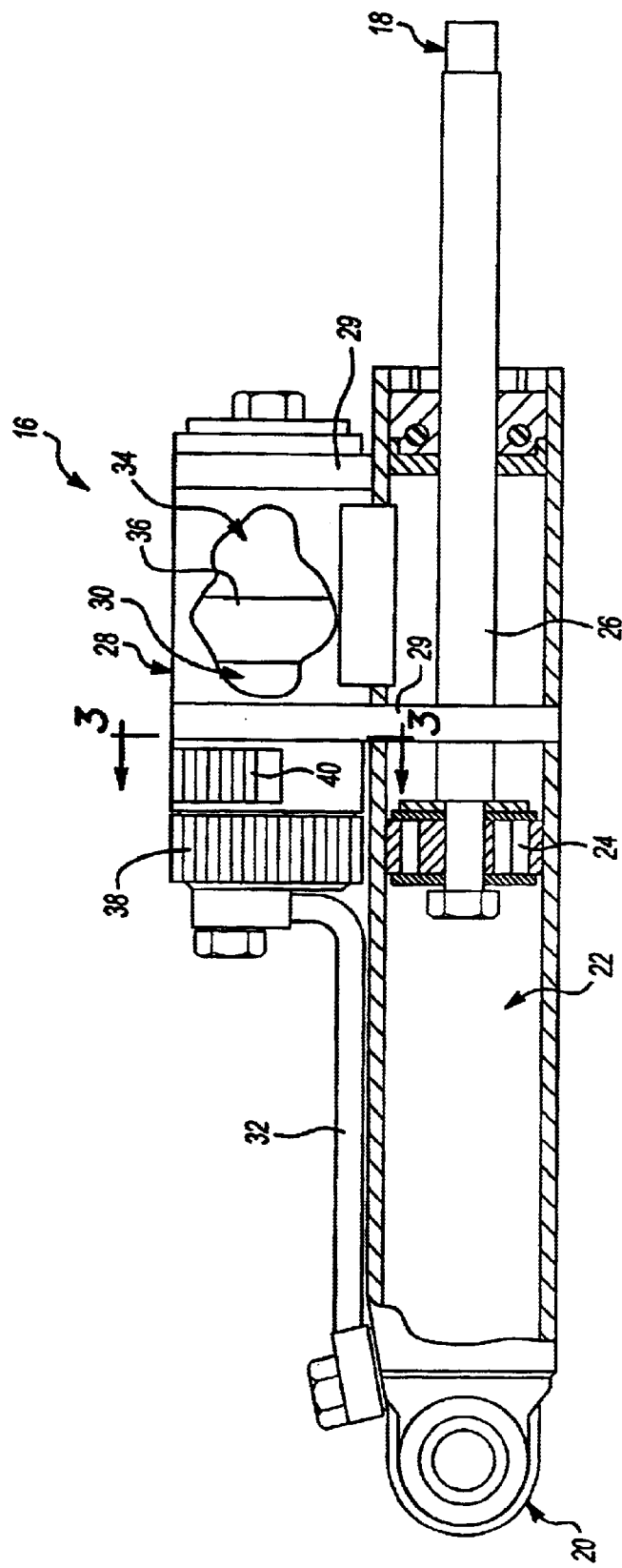
FIG. 2 is a cross-sectional view an adjustable shock absorber of the present invention.

FIG. 2 illustrates the present invention adjustable shock absorber 16, which may be a monotube as shown. The shock absorber 16 is attached to a suspension assembly by upper 18 and lower 20 ends. The shock absorber 16 includes a main chamber 22 filled with hydraulic fluid. The chamber 22 has a piston 24 disposed within the chamber 22 with a rod 26 extending from the piston 24. To reduce the overall length of the shock absorber 16, a remote chamber 28 may be secured to the main chamber 22 by straps 29, as is known in the art. The remote chamber 28 has a fluid chamber 30 that is fluidly connected to the main chamber 22 by a fluid line 32 to allow fluid to flow from the main chamber 22 to the fluid chamber 30. The remote chamber 28 also includes a gas chamber 34 that is separated from the fluid chamber 30 by a floating piston 36.

An adjustment member 38, preferably a knob, is located on the remote chamber 28 to permit adjustment of the damping characteristics of the shock absorber 16, and in turn, adjustment of the ride handling characteristics of the snowmobile. To assist the user in adjusting the shock absorber 16, a label 40 may be provided near the adjustment knob 38. The label 40 may indicate, for example, the directions of adjustment for a softer or firmer ride.

Figure 3:
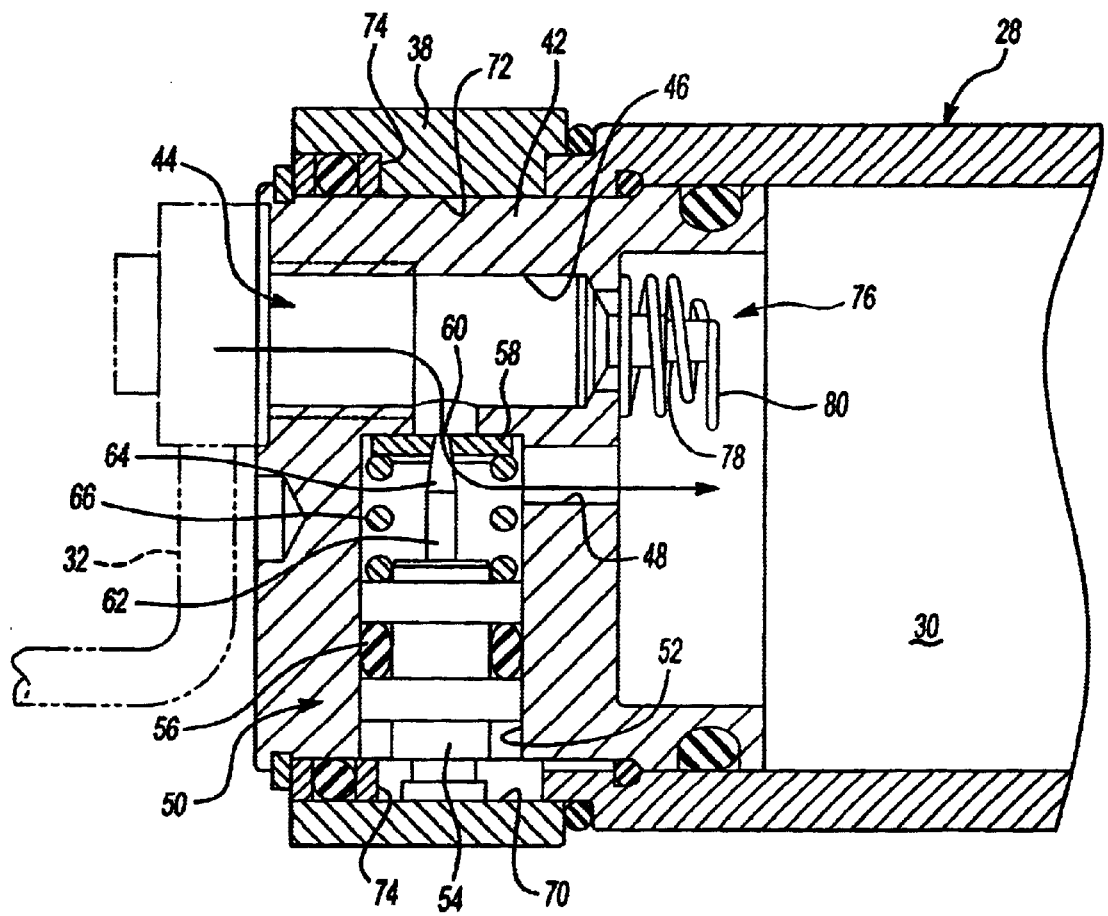
FIG. 3 is a cross-sectional view of the adjustable shock absorber taken along line 3—3 of FIG. 2.

Referring to FIG. 3, the remote chamber 28 includes a body 42 that defines a passageway 44 having first 46 and second 48 passages. The first passage 46 is in fluid communication with the fluid line 32, and the second passage 48 is in fluid communication with the fluid chamber 30. A valve assembly 50 is arranged between the first 46 and second 48 passages to control the flow of fluid from the main chamber 22 to the fluid chamber 30 thereby controlling damping.

The valve assembly 50 includes a blow-off valve and a metering valve that share common components to permit simultaneous adjustment of the valves. The valve assembly 50 includes a plunger 54 disposed in a bore 52 in the body 42. A seal 56 is arranged between the plunger 54 and bore 52 to prevent leakage of fluid from the body 42. A disc 58 includes an orifice 60 that fluidly connects the first 46 and second 48 passages. A needle 62 extends from the plunger 54 and includes a tapered end 64 partially disposed within the orifice 60. Together, the needle 62 and orifice 60 work as a metering valve by defining a flow area that controls the rate of fluid flow from the first passage 46 to the second passage 48 during the compression stroke. The plunger 54 may be moved linearly within the bore 52 by the adjustment knob 38 to change the flow area.

A spring 66 is arranged between the plunger 54 and the disc 58 to provide a blow-off valve. The spring 66 biases the disc 58 to a closed position. When a predetermined pressure is reached in the first passage 46, the spring 66 is compressed and the disc 58 moves to an open position. The adjustment knob 38 may be moved to load the spring 66 by moving the plunger 54. A change in spring loading changes the pressure at which the disc 58 moves from the closed position to the open position during the compression stroke.

The adjustment knob 38 includes an inner surface 70 that has a cammed surface 72 extending radially inwardly. The cammed surface 72 engages the plunger 54 so that as the knob 38 is rotated the linear position of the plunger is adjusted. In this manner, the flow area of the metering valve and the loading of the blow-off valve spring are adjusted simultaneously.

Although the invention thus far has been described in terms of simultaneous adjustment, it is to be understood that the metering and blow-off valve may be separated for independent adjustment to provide independent adjustment of each. The metering valve controls damping at low to mid range compression speeds, and the blow-off valve controls damping at mid to high range compression speeds. The metering and blow-off valves may be arranged between the first and second passages with each valve having its own plunger and cammed adjustment member. Accordingly, damping at low and high speeds may be adjusted independently.

A replenishing valve 76 fluidly connects the first passage 46 and the fluid chamber 30 to permit fluid to return to the main chamber 22 on the rebound stroke. The valve 76 may include a valve body 78 that typically includes an orifice. The replenishing valve 76 is biased to a closed position by a spring 80.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An adjustable shock absorber comprising:

a body having a fluid passageway including first and second passages in fluid communication with one another;

a valve assembly interposed between said first and second passages, said valve assembly including a plunger adjustable between a plurality of positions corresponding to a plurality of fluid flow positions, said valve assembly including an orifice and said plunger including a needle having a portion disposed within said orifice to provide a flow area, said plunger moving said needle between said position to change said flow area, and said valve assembly including a blow-off valve having a disc with said orifice interposed between said passages and movable between open and closed positions and a spring interposed between said plunger and said disc biasing said disc to said closed position, said plunger changing loading of said spring between said plurality of positions; and an adjustment member having a cammed surface coacting with said plunger to move said plunger between said plurality of position in response to actuation of said adjustment member.

2. An adjustable shock absorber comprising:

a body having a fluid passageway including first and second passages in fluid communication with one another;

a valve assembly interposed between said first and second passages, said valve assembly including a plunger with a needle adjustable between a plurality of positions corresponding to a plurality of fluid flow positions, said valve assembly includes a blow-off valve having a disc with an orifice interposed between said passages and movable between open and closed positions and a spring interposed between said plunger and said disc biasing said disc to said closed position, said plunger changing loading of said spring between said plurality of positions, and said needle having a portion disposed with said orifice to provide a flow area with said plunger moving said needle between said positions to change said flow area; and an adjustment member coacting with said plunger to move said plunger between said plurality of positions in response to actuation of said adjustment member.

3. The shock absorber according to claim 2, wherein said adjustment member includes a cammed surface engaging said plunger.

4. The shock absorber according to claim 3, wherein said adjustment member includes a knob having an inner surface with said cammed surface extending radially inwardly from said inner surface.

5. The shock absorber according to claim 2, wherein said plunger is movable between an infinite number of positions.

* * * * *